Aug. 16, 1966 M. O. FELIX 3,267,387
TEMPERATURE AND FREQUENCY STABLE AMPLIFIER
Filed Feb. 6, 1964
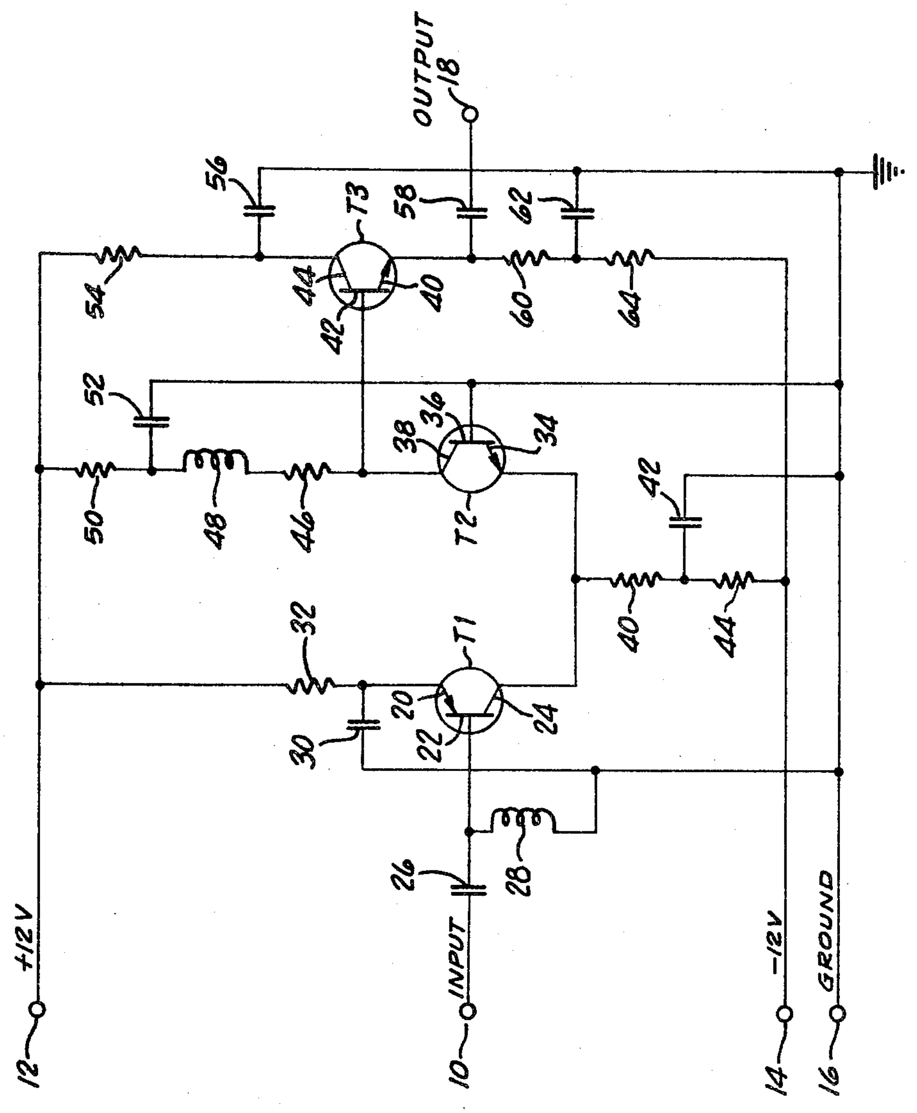
MICHAEL O. FELIX
INVENTOR.
BY James H. Griffin
ATTORNEY United States Patent Office 3,267,387
Patented August 16, 1966

3,267,387
TEMPERATURE AND FREQUENCY STABLE AMPLIFIER

Michael O. Felix, San Carlos, Calif., assignor to Ampex Corporation, Redwood City, Calif., a corporation of California Filed Feb. 6, 1964, Ser. No. 343,078
7 Claims. (Cl. 330—17)

This application relates in general to amplifiers and more particularly to amplifier circuits suitable for use in conjunction with transducers, often called preamplifiers.

The invention will be described in connection with a transistorized preamplifier for use in the input circuit of a magnetic tape recorder, but it is to be understood the principles of applicant's amplifier may be applied to amplification circuits of all types and, indeed, to other circuits where low noise, voltage, and current stability are important considerations. In using germanium transistors in amplifiers or other circuits, the best performance as far as minimizing noise is concerned requires that both current and voltage be maintained at certain levels throughout operation, about ½ milliampere for current and ½ to 2 volts for voltage, for radio frequencies; at audio frequencies optimum current would be much lower, perhaps 10 milliampere. It is highly desirable these operating levels be not only established initially but also maintained throughout, with good temperature and frequency stability.

The general object of this invention is to provide for decreased noise in germanium transistors in various circuits, by establishing and maintaining optimum voltage and current operating levels.

Another object of this invention is to provide an improved transistor amplifier.

Another object of this invention is to provide a magnetic tape recorder playback preamplifier which has an optimum source resistance such that the head impedance can be made low enough not to resonate with stray capacitances.

Another object is to provide a magnetic tape recorder playback preamplifier, the output of which is unaffected by variations in playback head inductance or stray capacitance, while at the same time maintaining optimum signal/noise ratio.

Another object is to provide a transistor amplifier exhibiting minimum noise characteristics.

Another object of the invention is to provide a transistor amplifier circuit of good temperature and frequency stability without introducing added complexity, bulk, and expense of components.

In the achievement of the above objects and as a feature of applicant's invention, a germanium transistor of one conductivity type, either P-N-P or N-P-N, is placed in cascade with a silicon transistor of the opposite conductivity type. The base of the silicon transistor is grounded, and the emitter thereof is directly joined to the collector of the germanium transistor. Since the emitter of a silicon transistor in the grounded base configuration is held at a relatively constant voltage whenever collector current is flowing, the collector of the germanium transistor, directly joined thereto, will be held at the same voltage. Thus, D.C. voltage stability of the germanium transistor is achieved. Current stability becomes a problem to be solved by the bias circuitry at the emitter of each transistor.

Other objects and features of applicant's invention and a fuller understanding thereof may be had by referring to the following description and claims taken in conjunction with the accompanying drawing in which there is shown a schematic drawing of a preferred embodiment of the principles of applicant's invention.

Referring to the drawing, the preferred circuit illustrated schematically therein has an input terminal 10, two power supplies 12 and 14, herein specified for the purposes of illustration as +12 and −12 volts, respectively, a ground terminal 16, and an output terminal 18. The input terminal 10 may be directly coupled to some transducer producing a very weak signal, such as the playback head of a magnetic tape recorder.

A P-N-P germanium transistor T1 having emitter 20, base 22, and collector 24 has its base 22 coupled through a capacitor 26 to the input terminal 10 and through an inductor 28 to ground 16. The emitter 20 of the transistor T1 is grounded as to A.C. through the capacitor 30 and is coupled to the power supply 12 through a resistor 32.

An N-P-N silicon transistor T2, having emitter 34, base 36, and collector 38, has its emitter 34 directly joined to the collector 24 of the transistor T1. The emitter 34 is also coupled through a resistor 40 to a capacitor 42 directly joined to ground and to a resistor 44 directly joined to the power supply 14. The base 36 of the transistor T2 is directly joined to ground 16. A transistor T3, having emitter 40, base 42, and collector 44, is incorporated into applicant's preferred circuit in an emitter-follower configuration in order to provide a low output impedance at the collector 38 and a high input impedance to the circuitry beyond the output terminal 18. Accordingly, the base 42 of the transistor T3 is directly coupled to the collector 38 of the transistor T2. The base 42 is also coupled through a resistor 46 and an inductor 48, in series, to a resistor 50 leading to the power supply 12 and to a capacitor 52 directly joined to ground 16. The collector 44 of the transistor T3 is coupled to the power supply 12 through a resistor 54 and to ground through a capacitor 56. The emitter 40 is coupled through a capacitor 58 to the output terminal 18 and through a resistor 60 to a capacitor 62 which is grounded and to a resistor 64 which is joined to the power supply 14.

In the operation of the above-described circuit, a very weak A.C. signal appears at the input terminal 10 and is applied through the coupling capacitor 26 to the base 22 of the P-N-P germanium transistor T1. The base 22 is grounded as to D.C. through the inductor 28, thus the capacitor 26 and the inductor 28 cooperate to insure that no D.C. current from the transistor T1 will escape forward of the input terminal 10, where it would very likely upset the operation of any type of transducer to which applicant's preferred circuit might be coupled. The emitter of the transistor T1, being coupled to the power supply 12 through the resistor 32, which is selected quite high in resistance, will have an operating current through it roughly equal to the difference in potential between the power supply 12 and the collector 24 divided by the resistance of resistor 32. The decoupling capacitor 30 insures that the whole input voltage appears between base and emitter.

The collector 24, being directly joined to the emitter 34 of the transistor T2, will have a relatively fixed D.C. voltage throughout the operation of applicant's preferred circuit herein described, because the emitter 34 of the transistor T2 has a fixed voltage (about −.6 v.) due to the grounded base configuration of the transistor T2. The decoupling capacitor 42 provides A.C. grounding between the resistors 40 and 44 coupling the emitter 34 to the negative power supply 14. Since the A.C. input impedance of the transistor T2 is very small compared to that of the resistor 40, virtually the whole A.C. collector current of the transistor T1 flows into the transistor T2 and therefore into the load resistor 46. The amplified signal produced by the preamplifier appears on the collector 38 of the transistor T2, from which it is passed through the impedance matching stage consisting of the transistor T3 and its associated circuit elements. The transistor T3, being in the grounded collector configuration, provides a high output impedance looking toward the output terminal 18 from the collector 38 of the transistor T2 and yet a low input impedance looking back into the preamplifier circuit from the output terminal 18, where the amplified signal of the collector 38 finally appears ready for application to whatever circuitry comes beyond applicant's preamplifier.

A magnetic tape recorder transducer preamplifier in accordance with the above description and drawing was built and operated using the following components:

| | |
|---|---|
| Voltages: | v. |
| **12** | +12 |
| **14** | −12 |
| Transistors: | |
| T1 | 2N976 |
| T2 | 2N2222 |
| T3 | 2N2222 |
| Resistors: | Ohms |
| **32** | 13.6K |
| **40** | 3.3K |
| **44** | 2.2K |
| **46** | 1.5K |
| **50** | 3.3K |
| **54** | 330 |
| **60** | 1K |
| **64** | 1K |
| Capacitors: | Microfarads |
| **26** | .1 |
| **30** | .1 |
| **42** | .47 |
| **52** | .47 |
| **56** | .1 |
| **58** | .1 |
| **62** | .1 |
| Inductors: | Microhenries |
| **28** | 1000 |
| **48** | 47 |

The circuit as defined above has a current of .8 milliampere through the germanium transistor T1, and the voltage at the collector 24 of the transistor T1 is, of course, a —.6 volt. The resistors 40 and 44 appearing between a voltage of −12 volts and a voltage of —.6 volt, the current through them is 2 milliamperes. Since .8 milliampere flow through the transistor T1, the remaining 1.2 milliamperes flows through the transistor T2. The input signal to this preamplifier was a 4 megacycle carrier of about 1 millivolt peak-to-peak amplitude. The circuit achieved a voltage gain of 50, with a noise factor of better than 2 decibels.

Thus applicant has provided a transistor amplifier circuit wherein a decreased noise factor is achieved by the maintenance of optimum voltage and current operating levels in the transistors. Due to the fixed voltage standard established by the grounded-base silicon transistor T2, the temperature stability of applicant's circuit is excellent; yet all this has been achieved without the addition of any circuit elements specifically related to this problem.

A number of alternative arrangements will be readily suggested to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A transistor amplifier circuit comprising: a first transistor of the germanium type having emitter, base, and collector, the base of the first transistor being coupled to receive signals to be amplified by the circuit, a second transistor of the silicon type, of the opposite conductivity type of the first transistor, and having emitter, base, and collector, the base of the second transistor being grounded and the emitter of the second transistor being directly coupled to the collector of the first transistor.

2. A transistor amplifier circuit comprising: a first transistor of the germanium type having emitter, base, and collector, the base of the first transistor being coupled to receive signals to be amplified by the circuit, a second transistor of the silicon type, of the opposite conductivity type of the first transistor, and having emitter, base, and collector, the base of the second transistor being grounded and the emitter of the second transistor being directly coupled to the collector of the first transistor, a third transistor having emitter, base, and collector, the base of the third transistor being directly joined to the collector of the second transistor, and the emitter of the third transistor being coupled to the output terminal of the amplifier circuit.

3. A transistor amplifier circuit comprising: a first transistor of the germanium type having emitter, base, and collector, the base of the first transistor being coupled to receive signals to be amplified by the circuit, the emitter of the first transistor being coupled through a first resistor to a first power supply, a second transistor of the silicon type, of the opposite conductivity type of the first transistor, and having emitter, base, and collector, the base of the second transistor being grounded and the emitter of the second transistor being directly coupled to the collector of the first transistor and being coupled through a second resistor to a second power supply, the collector of the second transistor being coupled through a third resistor to the first power supply, a third transistor having emitter, base, and collector, the base of the third transistor being directly joined to the collector of the second transistor, the collector of the third transistor being coupled through a fourth resistor to the first power supply, and the emitter of the third transistor being coupled through a fifth resistor to the second power supply and through a coupling capacitor to the output terminal of the amplifier circuit.

4. A transistor amplifier circuit comprising: a first transistor of the germanium type having emitter, base, and collector, the base of the first transistor being coupled to receive signals to be amplified by the circuit, the emitter of the first transistor being coupled through a resistor of more than ten thousand ohms to a first power supply, a second transistor of the silicon type, of the opposite conductivity type of the first transistor, and having emitter, base, and collector, the base of the second transistor being grounded and the emitter of the second transistor being directly coupled to the collector of the first transistor and being coupled through a resistor of more than five thousand ohms to a second power supply, the collector of the second transistor being coupled through a resistor to the first power supply, a third transistor having emitter, base, and collector, the base of the third transistor being directly joined to the collector of the second transistor, the collector of the third transistor being coupled through a resistor to the first power supply, and the emitter of the third transistor being coupled through a resistor to the second power supply and through a coupling capacitor to the output terminal of the amplifier circuit.

5. A transistor amplifier circuit comprising: a first transistor of the germanium type having emitter, base, and collector, the base of the first transistor being coupled through an inductor to ground and through a capacitor to the source of the signals to be amplified by the circuit, the emitter of the first transistor being coupled through a resistor of over ten thousand ohms to a first power supply and through a capacitor to ground, a second transistor of the silicon type, of the opposite conductivity type of the first transistor, and having emitter, base, and collector, the base of the second transistor being grounded and the emitter of the second transistor being directly coupled to the collector of the first transistor and being coupled through a resistor of over five thousand ohms to a second power supply and through a capacitor to ground, the collector of the second transistor being coupled through a resistor to the first power supply, a third transistor having emitter, base, and collector, the base of the third transistor being directly joined to the collector of the second transistor, the collector of the third transistor being coupled through a capacitor to ground and through a resistor to the first power supply, and the emitter of the third transistor being coupled through a resistor to the second power supply and through a coupling capacitor to the output terminal of the amplifier circuit.

6. A transistor amplifier circuit comprising: a first transistor of the germanium type having emitter, base, and collector, the base of the first transistor being coupled through an inductor to ground and through a capacitor to the source of the signals to be amplified by the circuit, the emitter of the first transistor being coupled through a resistor to a first power supply and through a second capacitor to ground, and a second transistor of the silicon type, of the opposite conductivity type of the first transistor, and having emitter, base, and collector, the base of the transistor being grounded and the emitter of the second transistor being directly coupled to the collector of the first transistor and being coupled through a second resistor to a second power supply and through a third capacitor to ground, the collector of the second transistor being coupled through a third resistor to the first power supply.

7. A transistor amplifier circuit according to claim 6, further defined by a third transistor having emitter, base, and collector, the base of the third transistor being directly joined to the collector of the second transistor, the collector of the third transistor being coupled through a fourth capacitor to ground and through a fourth resistor to the first power supply, and the emitter of the third transistor being coupled through a fifth resistor to the second power supply and through a fifth capacitor to the output terminal of the amplifier circuit.

References Cited by the Examiner

UNITED STATES PATENTS

| | | | |
|---|---|---|---|
| 2,794,076 | 5/1957 | Shea | 330—20 |
| 2,852,625 | 9/1958 | Nuut | 330—19 X |
| 2,936,427 | 5/1960 | Smith | 330—19 X |
| 2,963,656 | 12/1960 | Parris | 330—17 |
| 3,192,483 | 6/1965 | Murray | 330—19 |
| 3,200,343 | 8/1965 | Skinner | 330—20 X |

ROY LAKE, *Primary Examiner.*

F. D. PARIS, *Assistant Examiner.*